United States Patent
Maekawa et al.

(10) Patent No.: US 9,722,276 B2
(45) Date of Patent: Aug. 1, 2017

(54) SOLID ELECTROLYTE, METHOD FOR PRODUCING THE SAME, AND SECONDARY BATTERY COMPRISING SOLID ELECTROLYTE

(75) Inventors: Hideki Maekawa, Sendai (JP); Hitoshi Takamura, Sendai (JP); Shinichi Orimo, Sendai (JP); Motoaki Matsuo, Sendai (JP); Yuko Nakamori, Sendai (JP); Mariko Ando, Sendai (JP); Yasuto Noda, Sendai (JP); Taiki Karahashi, Sendai (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 797 days.

(21) Appl. No.: 12/989,968

(22) PCT Filed: May 12, 2009

(86) PCT No.: PCT/JP2009/058835
§ 371 (c)(1),
(2), (4) Date: Dec. 30, 2010

(87) PCT Pub. No.: WO2009/139382
PCT Pub. Date: Nov. 19, 2009

(65) Prior Publication Data
US 2011/0117440 A1    May 19, 2011

(30) Foreign Application Priority Data
May 13, 2008 (JP) .................... 2008-125862

(51) Int. Cl.
*H01M 10/052* (2010.01)
*H01M 10/0562* (2010.01)
*H01B 1/12* (2006.01)

(52) U.S. Cl.
CPC .......... *H01M 10/052* (2013.01); *H01B 1/122* (2013.01); *H01M 10/0562* (2013.01);
(Continued)

(58) Field of Classification Search
CPC .......... H01M 10/052; H01M 10/0562; H01M 10/0525; H01M 6/18; H01M 10/0567
(Continued)

(56) References Cited

U.S. PATENT DOCUMENTS 5,731,117 A * 3/1998 Ferrar .................... G03G 5/142
                                                        428/195.1
6,203,939 B1 * 3/2001 Wilson .......................... 429/112
(Continued)

FOREIGN PATENT DOCUMENTS

JP          11185811       * 7/1999 ............ H01M 10/40
JP        A-2000-123874      4/2000
(Continued)

OTHER PUBLICATIONS

Maekawa et al., "Halide-stabilized LiBH4, a room-temperature lithium fast-ion conductor," 2009, J. Am. Chem. Soc., vol.. 131, pp. 894-895.*

(Continued)

*Primary Examiner* — Barbara Gilliam
*Assistant Examiner* — Angela Martin
(74) *Attorney, Agent, or Firm* — Oliff PLC (57) ABSTRACT

A solid electrolyte comprising:
  $LiBH_4$; and
  an alkali metal compound represented by the following formula (1):
    MX                                                        (1)
  (in the formula (1), M represents an alkali metal atom, and X represents one selected from the group consisting of
(Continued)

halogen atoms, $NR_2$ groups (each R represents a hydrogen atom or an alkyl group) and $N_2R$ groups (R represents a hydrogen atom or an alkyl group)).

18 Claims, 10 Drawing Sheets

(52) U.S. Cl.
CPC .............. *H01M 2300/0068* (2013.01); *H01M 2300/0091* (2013.01)

(58) Field of Classification Search
USPC .......................... 429/304, 306, 322, 323, 199
See application file for complete search history.

(56) References Cited

U.S. PATENT DOCUMENTS

| | | |
|---|---|---|
| 6,368,746 B1 | 4/2002 | Takada et al. |
| 6,383,688 B1 * | 5/2002 | Inagaki et al. ................ 429/322 |
| 2007/0160911 A1 | 7/2007 | Senga et al. |

FOREIGN PATENT DOCUMENTS

| | | |
|---|---|---|
| JP | A-2003-077462 | 3/2003 |
| JP | A-2005-228570 | 8/2005 |
| JP | A-2007-273217 | 10/2007 |

OTHER PUBLICATIONS

Johansson, Patrik, "Electronic structure calculations on lithium battery electrolyte salts", 2007, Physical Chemistry Chemical Physics, 9, pp. 1493-1498.*

Maekawa, Hideki et al., Halide-stabilized LiBH4, a room-temperature lithium fast-ion conductor, Jan. 2, 2009, J. Am. Chem. Soc., 131 (3), pp. 894-895.*

Mosegaard, Lene et al., Reactivity of LiBH4: in situ synchrotron radiation powder x-ray diffraction study, Jan. 9, 2008, J. Phys. Chem., 112 (4), pp. 1299-1303.*

Matsuo et al.; "Lithium superionic conduction in lithium borohydride accompanied by structural transition;" *Applied Physics Letters*; 2007; vol. 91; American Institute of Physics.

Maekawa et al.; "Halide-Stabilized LiBH4, a Room-Temperature Lithium Fast-Ion Conductor;" *J. Am. Chem. Soc.*; 2009; pp. 894-895; vol. 131; American Chemical Society.

Matsuo et al.; "Li super-ionic conduction in LiBH$_4$;" Collected Abstracts of the *2008 Spring Meeting of the Japan Institute Metals*; Mar. 26, 2008; pp. 171-172; Maruzen Co., Ltd., Tokyo, Japan (with translation).

International Search Report dated Aug. 11, 2009 in corresponding International Application No. PCT/JP2009/058835.

* cited by examiner

SOLID ELECTROLYTE, METHOD FOR PRODUCING THE SAME, AND SECONDARY BATTERY COMPRISING SOLID ELECTROLYTE

TECHNICAL FIELD

The present invention relates to a solid electrolyte and a method for producing the same. More specifically, the present invention relates to a lithium-ion-conducting solid electrolyte and a method for producing the same. Moreover, the present invention relates to a secondary battery comprising such a solid electrolyte.

BACKGROUND ART

As portable devices have come into widespread use, the demands for small secondary batteries having a large capacity have increased in recent years. Among secondary batteries currently in practical use, lithium on secondary batteries have been known as batteries having the highest energy density. In such a conventional lithium ion secondary battery, an organic solvent electrolyte which exhibits a high ion conductivity is used as an electrolyte. However, the organic solvent electrolyte is liquid and flammable. Hence, when used as an electrolyte for a lithium ion secondary battery, the organic solvent electrolyte poses risks for developing leakage of the liquid, ignition or the like. There is a safety concern about the use of the organic solvent electrolyte. For this reason, a safer solid electrolyte has been demanded as an electrolyte for a lithium ion secondary battery.

Polymer-based, oxide-based, and sulfide-based solid electrolytes and the like have been known as solid electrolytes having a lithium ion conductivity. For example, Japanese Unexamined Patent Application Publication No. 2005-228570 (PLT 1) discloses a solid electrolyte obtained by using, as a raw material, a sulfide-based crystallized glass containing elements of lithium, phosphorus, and sulfur, which has a lithium ion conductivity. Meanwhile, Japanese Unexamined Patent Application Publication No. 2007-273217 (PLT 2) discloses a solid electrolyte containing elements of lithium, phosphorus, sulfur, and oxygen, as well as another element belonging to any one of Groups 13 to 16 of the periodic table (provided that phosphorus, sulfur, and oxygen are, excluded).

Meanwhile, the present inventors have found that $LiBH_4$ exhibits a high ion conductivity at high temperatures of approximately 117° C. (approximately 390 K) and above (M. Matsuo, Y. Nakamori, S. Orimo, H. Maekawa, and H. Takamura, Appl. Phys. Lett., 2007, vol. 91, 224103 (NPL 1)). However, $LiBH_4$ has a large resistance below 115° C. (308 K), which is a transition temperature thereof from a high-ion-conductive phase (a high-temperature phase). Accordingly, the use of $LiBH_4$ as an electrolyte for a lithium ion secondary battery involves a problem of a low ion conductivity at low temperatures, in particular, at around room temperature.

CITATION LIST

Patent Literature

PTL 1: Japanese Unexamined Patent Application Publication No. 2005-228570

PTL 2: Japanese Unexamined Patent Application Publication No. 2007-273217

Non Patent Literature

NPL 1: M. Matsuo, Y. Nakamori, S. Orimo, H. Maekawa, and H. Takamura, Appl. Phys. Lett., 2007, vol. 91, 224103

SUMMARY OF INVENTION

Technical Problem

The present invention has been made in view of the above-described problems of the conventional techniques, and an object of the present invention is to provide a $LiBH_4$-based solid electrolyte which exhibits a high ion conductivity even below the transition temperature (115° C.) of $LiBH_4$ from the high-temperature phase.

Solution to Problem

The present inventors have made earnest study to achieve the above-described object. As a result, the present inventors have found that, by mixing $LiBH_4$ with a specific alkali metal compound, and then heating the mixture, thereby melting or sintering the mixture, a transition temperature of the melted mixture or the sintered product from a high-temperature phase is lowered, so that a high ion conductivity is exhibited even below the transition temperature of $LiBH_4$. This finding has led to the completion of the present invention.

A solid electrolyte of the present invention comprises: $LiBH_4$; and an alkali metal compound represented by the following formula (1):

$$MX \qquad (1)$$

(in the formula (1), M represents an alkali metal atom, and X represents one selected from the group consisting of halogen atoms, $NR_2$ groups (each R represents a hydrogen atom or an alkyl group) and $N_2R$ groups (R represents a hydrogen atom or an alkyl group)). A molar ratio between the $LiBH_4$ and the alkali metal compound is preferably as follows: $LiBH_4$:alkali metal compound=1:1 to 20:1. Such a solid electrolyte is useful as a solid electrolyte for a lithium ion secondary battery.

In addition, the solid electrolyte preferably has diffraction peaks at least in five regions of $2\theta=24.0\pm1.0$ deg, $25.6\pm1.2$ deg, $27.3\pm1.2$ deg, $35.4\pm1.5$ deg, and $42.2\pm2.0$ deg in X-ray diffraction (CuK$\alpha$: $\lambda=1.5405$ Å) measured below 115° C.

The solid electrolyte of the present invention can be manufactured by a method comprising: mixing $LiBH_4$ with an alkali metal compound represented by the following formula (1)

$$MX \qquad (1)$$

(in the formula (1), M represents an alkali metal, atom, and X represents one selected from the group consisting of halogen atoms, $NR_2$ groups (each R represents a hydrogen atom or an alkyl group) and $N_2R$ groups (R represents a hydrogen atom or an alkyl group)); heating the mixture, thereby melting or sintering the mixture; and then cooling the mixture.

In the method for producing the solid electrolyte of the present invention, a molar ratio between the $LiBH_4$ and the alkali metal compound mixed with each other is preferably as follows: $LiBH_4$:alkali metal compound=1:1 to 20:1. Moreover, a temperature to which the mixture is heated is 50° C. or higher.

A solid electrolyte obtained as described above is preferably heated at or above 115° C. This tends to increase the ion conductivity of the solid electrolyte below the transition temperature of LiBH$_4$ from the high-temperature phase.

In the present invention, X in the formula (1) is preferably any one of an iodine atom and an amino group, and the alkali metal compound is preferably at least one selected from the group consisting of LiI, RbI, and CsI.

ADVANTAGEOUS EFFECT OF INVENTION

According to the present invention, it is possible to provide a LiBH$_4$-based solid electrolyte which has a low transition temperature from a high-temperature phase, and which exhibits a high ion conductivity even below the transition temperature (115° C.) of LiBH$_4$ from the high-temperature phase.

DESCRIPTION OF EMBODIMENTS

Hereinafter, the present invention will be described in detail on the basis of preferred embodiments thereof.

First, a solid electrolyte of the present invention will be described. The solid electrolyte of the present invention comprises:

LiBH$_4$; and an alkali metal compound represented by the following formula (1):

MX     (1)

(in the formula (1), M represents an alkali metal atom, and X represents one selected from the group consisting of halogen atoms, NR$_2$ groups (each R represents a hydrogen atom or an alkyl group) and N$_2$R groups (R represents a hydrogen atom or an alkyl group)).

In the present invention, LiBH$_4$ is not particularly limited, and any already known. LiBH$_4$ which has been used as a reducing agent or a hydrogen storage medium can be used. The purity of LiBH$_4$ is preferably 80% or higher, and more preferably 90% or higher. If the purity of LiBH$_4$ is lower than the lower limit, performances of the solid electrolyte tend to be deteriorated.

Meanwhile, the alkali metal compound used in the present invention is represented by the above-described formula (1). In the above-described formula (1), M represents an alkali metal atom such as a lithium atom (Li), a sodium atom (Na), a potassium atom (K), a rubidium atom (Rb), Or a cesium atom (Cs). Examples of the halogen atom, which is X in the above-described formula (1), include an iodine atom (I), a bromine atom (Br), a fluorine atoms (F), a chlorine atom (Cl), and the like. Meanwhile, examples of the R in the NR$_2$ group or the N$_2$R group include a hydrogen atom, and alkyl groups. The number of carbon atoms in each alkyl group is preferably 1 to 5. Two R's in the NR$_2$ group may be the same or different.

The alkali metal atom is preferably a lithium atom, a rubidium atom, or a cesium atom. X in the above-described formula (1) is preferably an iodine atom, a bromine atom, or an NR$_2$ group, and more preferably an iodine atom or an NH$_2$ group. The use of the alkali metal compound having such an atom or a group can improve the performances of the solid electrolyte.

Such alkali metal compounds may be used singly or in combination of two or more kinds thereof. Of the alkali metal compounds, a halide of an alkali metal or an amine salt thereof is preferable, a lithium halide such as LiI, LiBr, LiF, or LiCl; a rubidium halide such as RbI, RbBr, RbF, or RbCl; a cesium halide such as CsI, CsBr, CsF, or CsCl; or a lithium amide such as LiNH$_2$, LiNHR, or LiNR$_2$ is more preferable, LiI, RbI, CsI, or LiNH$_2$ is particularly preferable, and the use of LiI and RbI in combination is most preferable, from the viewpoint of further improvement of the performances of the solid electrolyte.

As such an alkali metal compound, an already known alkali metal compound can be used. In addition, the purity of the alkali metal compound is preferably 80% or higher, and more preferably 90% or higher. If the purity of the alkali metal compound is lower than the lower limit, performances of the solid electrolyte tend to be deteriorated.

A molar ratio (LiBH$_4$:alkali metal compound) between LiBH$_4$ and the alkali metal compound contained in the solid electrolyte of the present invention is preferably 1:1 to 20:1, and more preferably 1:1 to 10:1 . If the molar ratio is lower than the lower limit, the proportion of LiBH$_4$ in the solid electrolyte is so low that it tends to be difficult to achieve a high ion conductivity. Meanwhile, if the molar ratio exceeds the upper limit, it tends to be difficult to lower the transition temperature from the high-temperature phase (high-ion-conductive phase), and the ion conductivity below the transition temperature (115° C.) of LiBH$_4$ from the high-temperature phase tends not to be sufficiently increased.

In addition, when two or more of the alkali metal compounds are used in combination, the content ratio thereof is not particularly limited. However, when, for example, LiI and a different alkali metal compound (preferably RbI or CsI) are used in combination, it is preferable that LiI: different alkali metal compound=1:1 to 20:1, and more preferably that LiI:different alkali metal compound=5:1 to 20:1. If the molar ratio is lower than the lower limit, the proportion of LiI in the solid electrolyte is so low that thermal stability of the solid electrolyte tends to be lowered. Meanwhile, if the molar ratio exceeds the upper limit, the effect of the addition of the different alkali metal compound tends not to be achieved sufficiently, so that the ion conductivity is not increased sufficiently.

In X-ray diffraction (CuKα: λ=1.5405 Å) measured below the transition temperature of $LiBH_4$ from the high-temperature phase, namely, below 115° C., such a solid electrolyte preferably has diffraction peaks at least in five regions of 2θ=24.0±1.0 deg, 25.6±1.2 deg, 27.3±1.2 deg, 35.4±1.5 deg, and 42.2±2.0 deg, more preferably has diffraction peaks at least in five regions of 2θ=23.7±0.7 deg, 25.2±0.8 deg, 26.9±0.8 deg, 35.0±1.0 deg, and 41.3±1.0 deg, further preferably has diffraction peaks at least in five regions of 2θ=23.6±0.5 deg, 24.9±0.5 deg, 26.7±0.5 deg, 34.6±0.5 deg, and 40.9±0.5 deg, and particularly preferably has diffraction peaks at least in five regions of 2θ=23.6±0.3 deg, 24.9±0.3 deg, 26.7±0.3 deg, 34.6±0.3 deg, and 40.9±0.3 deg. The diffraction peaks in these five regions correspond to diffraction peaks of $LiBH_4$ in the high-temperature phase. A solid electrolyte having diffraction peaks in such five regions even below the transition temperature of $LiBH_4$ from the high-temperature phase tends to exhibit a high ion conductivity even below the transition temperature.

Next, a method for producing a solid electrolyte of the present invention will be described. The solid electrolyte of the present invention can be produced by mixing the above-described $LiBH_4$ with the alkali metal compound represented by the above-described formula (1); heating the obtained mixture, thereby melting or sintering the obtained mixture; and then cooling the mixture. However, the method for producing the solid electrolyte of the present invention is not particularly limited to such methods. Of such production methods, a method in which melt mixing is performed is preferable, from the viewpoint that a solid electrolyte uniformly comprising $LiBH_4$ and the alkali metal compound can be obtained.

The molar ratio ($LiBH_4$:alkali metal compound) between the $LiBH_4$ and the alkali metal compound mixed with each other is preferably 1:1 to 20:1, and more preferably 1:1 to 10:1. If the molar ratio is lower than the lower limit, the proportion of $LiBH_4$ in the obtained solid electrolyte is so low that it tends to be difficult to obtain a solid electrolyte having a high ion conductivity. Meanwhile, if the molar ratio exceeds the upper limit, it tends to be difficult to lower the transition temperature of the obtained solid electrolyte from the high-temperature phase (high-ion-conductive phase), and it tends to be difficult to obtain a solid electrolyte which exhibits a high ion conductivity even below the transition temperature (115° C.) of $LiBH_4$ from the high-temperature phase.

The temperature to which the mixture is heated is normally 50° C. or above, preferably 150° C. or above, more preferably 200° C. or above, particularly preferably 250° C. or above, and most preferably 200° C. or above. If the heating temperature is lower than the lower limit, the melting or the sintering of the mixture tends to be insufficient. In particular, the heating temperature for sintering the mixture is normally 50° C. to 240° C., preferably 150° C. to 240° C., and more preferably 200° C. to 240° C.

When the solid electrolyte is shaped into a predetermined shape in the present invention, the mixture of $LiBH_4$ and the alkali metal compound may be shaped in advance and then heated; alternatively, the mixture may be heated and then shaped. For example, the mixture of $LiBH_4$ and the alkali metal compound may be shaped into a predetermined shape by press molding or the like, heated to be melted or sintered while the shape is being kept, and then cooled. Alternatively, the mixture of $LiBH_4$ and the alkali metal compound may be heated to be melted, and the melted mixture is shaped into a predetermined shape, and cooled, or the mixture of $LiBH_4$ and the alkali metal compound may be heated to be sintered, and the sintered product is cooled, and then shaped into a predetermined shape.

Moreover, in the method for producing a solid electrolyte of the present invention, the solid electrolyte obtained as described above is preferably heated to 115° C. or above, and then cooled. Thereby, the ion conductivity of the solid electrolyte below the transition temperature of $LiBH_4$ from the high-temperature phase tends to be increased.

Next, a secondary battery of the present invention will be described. The secondary battery of the present invention comprises the solid electrolyte of the present invention, a cathode, and an anode. Examples of a material for the cathode include already known materials for cathodes of lithium ion secondary batteries, such as lithium cobaltate, lithium nickelate, and lithium manganate. Examples of a material for the anode include materials which are already known as materials for anodes of lithium ion secondary batteries, such as carbon materials.

The secondary battery of the present invention can be produced, for example, as follows. Specifically, the material for the cathode is applied onto one surface of the solid electrolyte formed into a film-like shape so as to form the cathode, and the material for the anode is applied onto the other surface so as to from the anode. Alternatively, the material for the cathode in a film-like shape is pasted onto one surface of the solid electrolyte formed into a film-like shape, and the material for the anode in a film-like shape is pasted onto the other surface.

EXAMPLES

Hereinafter, the present invention will be described in further detail on the basis of Examples and Comparative Example. However, the present invention is not limited to the following Examples.

Example 1

$LiBH_4$ (manufactured by Sigma-Aldrich Co., purity: 90%) and LiI (manufactured by Sigma-Aldrich Co., purity: 95.999%) were mixed with each other at a molar ratio of $LiBH_4$:LiI=3:1. The mixture was transferred to a glass cell, and then heated to 320° C. to preform melt mixing. Thereafter, the melted mixture was cooled to room temperature. Thus, a solid electrolyte was obtained.

Figure 1:
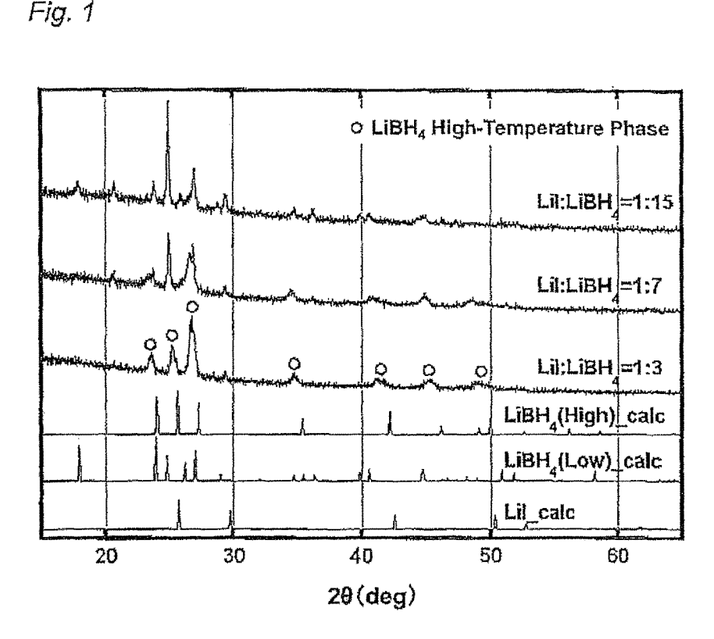
FIG. 1 is a graph showing X-ray diffraction patterns of solid electrolytes comprising LiBH$_4$ and LiI obtained in Examples 1 to 3.

The obtained solid electrolyte ($LiBH_4$:LiI=3:1) was subjected to X-ray diffraction measurement (CuKα: λ=1.5405 Å) at 25° C. FIG. 1 shows the result thereof. Note that FIG. 1 also shows X-ray diffraction spectra of $LiBH_4$ in a high-temperature phase (high-ion-conductive phase) and in a low-temperature phase, as well as an X-ray diffraction spectrum of LiI.

As is apparent from the result shown in FIG. 1, X-ray diffraction peaks were observed at positions of 2θ=23.4 deg, 25.1 deg, 26.7 deg, 34.7 deg, 41.2 deg, 45.3 deg, and 49.0 deg.

Example 2

A solid electrolyte was prepared in the same manner as in Example 1, except that the molar ratio of $LiBH_4$ to LiI was changed to $LiBH_4:LiI=7:1$. The solid electrolyte ($LiBH_4$: $LiI=7:1$) was subjected to X-ray diffraction measurement in the same manner as in Example 1. FIG. 1 shows the result. As is apparent from the result shown in FIG. 1, X-ray diffraction peaks were observed at positions of $2\theta=23.6$ deg, 25.0 deg, 26.6 deg, 34.5 deg, 40.9 deg, 44.8 deg, and 48.6 deg.

Example 3

A solid electrolyte was prepared in the same manner as in Example 1, except that the molar ratio of $LiBH_4$ to LiI was changed to $LiBH_4:LiI=15:1$. The solid electrolyte ($LiBH_4$: $LiI=15:1$) was subjected to X-ray diffraction measurement in the same manner as in Example 1. FIG. 1 shows the result. As is apparent from the result shown in FIG. 1, X-ray diffraction peaks were observed at positions of $2\theta=23.8$ deg, 24.8 deg, 26.9 deg, 34.6 deg, 40.7 deg, 44.8 deg, and 48.1 deg.

As is apparent from the results shown in FIG. 1, in the cases of the solid electrolytes comprising $LiBH_4$ and LiI of the present invention (Examples 1 to 3), x-ray diffraction peaks which corresponded to the high-temperature phase of $LiBH_4$ were observed at 25° C. In other words, it was found that, in the solid electrolyte comprising $LiBH_4$ and LiI of the present invention, the state of $LiBH_4$ in the high-temperature phase was kept even at 25° C.

Example 4

Figure 2:
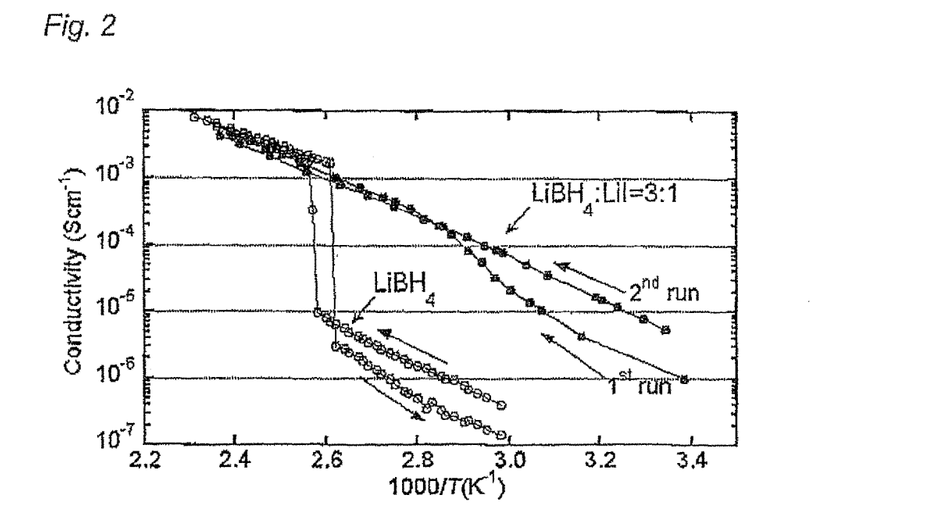
FIG. 2 is a graph showing the relationship between ion conductivity and measurement temperature of solid electrolytes obtained in Example 4 and Comparative Example 1.

A melted mixture ($LiBH_4:LiI=3:1$) prepared in the same manner as in Example 1 was press molded (25° C., 100 MPa) into a disk shape (diameter: 10 mm, thickness: approximately 2 mm). Thus, a solid electrolyte film was produced. Lithium foils were mounted on both sides of the solid electrolyte film as electrodes so as to form a cell for ion conductivity measurement. While the cell for ion conductivity measurement was being heated from around 25° C. (298 K) to around 150° C. (423 K), the ion conductivity of the solid electrolyte film was measured for approximately every 5° C. increase and at frequencies of 0.1 Hz to 10 MHz by using a "SI-1260 impedance analyzer" manufactured by Solartron, with a measurement time for each point being about 5 minutes. FIG. 2 shows the relationship between the ion conductivity (1st) and the measurement temperature at this time.

Figure 3:
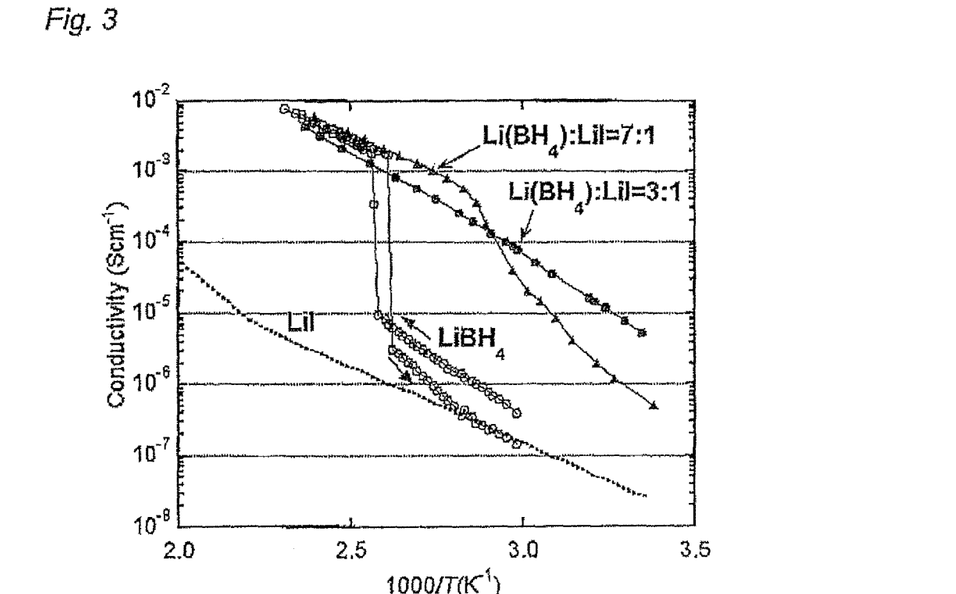
FIG. 3 is a graph showing the relationship between ion conductivity and measurement temperature of solid electrolytes obtained in Examples 4 and 5 as well as Comparative Example 1.

Subsequently, the cell for ion conductivity measurement, which had been subjected to the measurement, was cooled to room temperature. Then, while the cell was being heated under the same conditions as those described above, the ion conductivity thereof was measured. FIGS. 2 and 3 show the relationship between the ion conductivity (2nd) and the measurement temperature at this time. In addition, Table 1 shows the ion conductivity (2nd) at 77° C. (350 K).

Figure 4A:
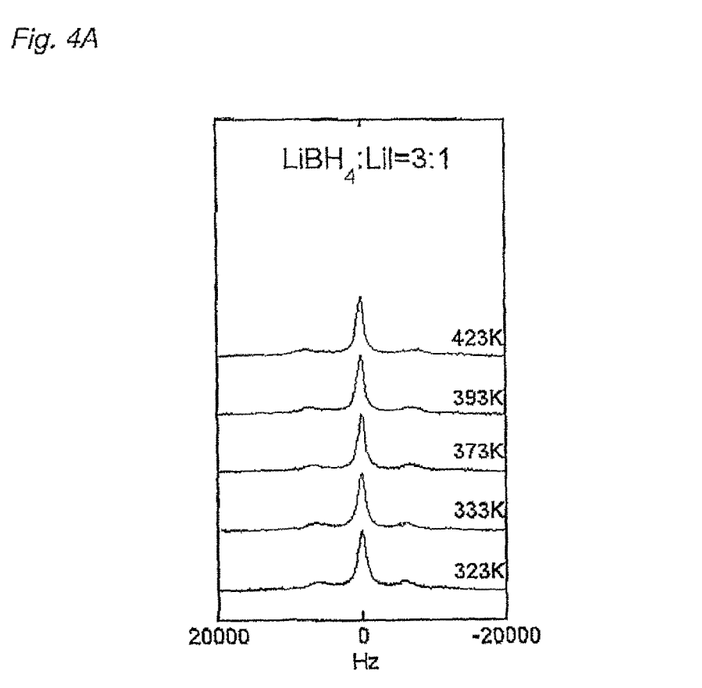
FIG. 4A is a graph showing $^7$Li-NMR spectra of the solid electrolyte obtained in Example 4.
Figure 5:
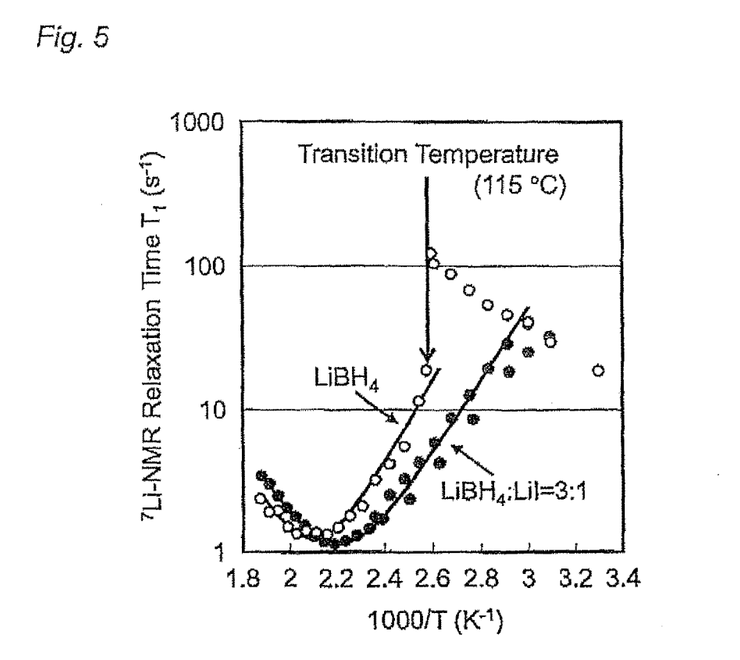
FIG. 5 is a graph showing the relationship between $^7$Li-NMR longitudinal relaxation time and measurement temperature of the solid electrolytes obtained in Example 4 and Comparative Example 1.

Subsequently, the solid electrolyte film was subjected to $^7$Li-NMR measurement by using a solid-state NMR spectrometer ("CMX Infinity 300" manufactured by Chemagnetics, Inc.) under conditions of a resonance frequency of 116 MHz and temperature of 50° C. (323 K) to 260° C. (533 K) to determine $^7$Li-NMR longitudinal relaxation time. FIG. 4A shows $^7$Li-NMR spectra at various temperatures. Meanwhile, FIG. 5 shows the relationship between the $^7$Li-NMR longitudinal relaxation time and the measurement temperature.

Example 5

A solid electrolyte film was produced in the same manner as in Example 4, except that a melted mixture ($LiBH_4:LiI=7:$ 1) prepared in the same manner as in Example 2 was used in place of the melted mixture ($LiBH_4:LiI=3:1$). Then, while the solid electrolyte film was being heated from around 20° C. (293 K) to around 150° C. (423 K), the ion conductivity thereof was measured for approximately every 5° C. increase, with a measurement time for each point being about 5 minutes. FIG. 3 shows the relationship between the ion conductivity and the measurement temperature. In addition, Table 1 shows the ion conductivity at 77° C. (350 K).

Comparative Example 1

A solid electrolyte film was produced in the same manner as in Example 4, except that $LiBH_4$ (manufactured by Sigma-Aldrich Co., purity: 90%) was used in place of the melted mixture ($LiBH_4:LiI=3:1$). Then, while the solid electrolyte film was being heated from around 60° C. (333 K) to around 160° C. (433 K), the ion conductivity thereof was measured for approximately every 2.5° C. increase, with a measurement time for each point being about 5 minutes. FIGS. 2 and 3 show the relationship between the ion conductivity and the measurement temperature at this time.

Subsequently, while the solid electrolyte film was being cooled from 160° C. (433 K) to 60° C. (333 K), the ion conductivity thereof was measured for approximately every 2.5° C. decrease, with a measurement time for each point being about 5 minutes. FIGS. 2 and 3 show the relationship between the ion conductivity and the measurement temperature at this time. Note that FIG. 3 also shows the results of measurement conducted on a solid electrolyte film comprising LiI according to Poulsen et al. (F. W. Poulsen et al., Solid State Ionics 9/10, 119 (1983)). In addition, Table 1 shows the ion conductivity at 77° C. (350 K).

Figure 4B:
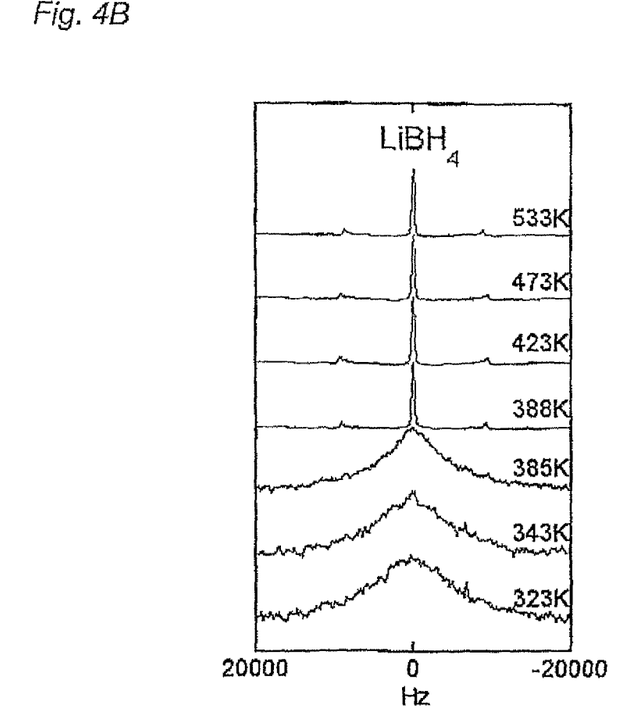
FIG. 4B is a graph showing $^7$Li-NMR spectra of the solid electrolyte obtained in Comparative Example 1.

Next, the solid electrolyte film was subjected to $^7$Li-NMR measurement in the same manner as in Example 4 under conditions of a resonance frequency of 116 MHz, and temperature of 30° C. (303 K) to 260° C. (533 C) to determine $^7$Li-NMR longitudinal relaxation time. FIG. 4B shows $^7$Li-NMR spectra at various temperatures. Meanwhile, FIG. 5 shows the relationship between the $^7$Li-NMR longitudinal relaxation time and the measurement temperature.

TABLE 1

| | Molar ratio | | Electrical conductivity at 350 K |
| --- | --- | --- | --- |
| | $LiBH_4$ | LiI | (Scm$^{-1}$) |
| Comp. Ex. 1 | 10 | 0 | $2.8 \times 10^{-7}$ |
| Ex. 4 | 3 | 1 | $1.9 \times 10^{-4}$ |
| Ex. 5 | 7 | 1 | $3.6 \times 10^{-4}$ |
| Poulsen et al. | 0 | 10 | $2.9 \times 10^{-7}$ |

As is apparent from the results shown in FIGS. 2 and 3, in the case of the solid electrolyte film comprising only $LiBH_4$ (Comparative Example 1), the ion conductivity below the transition temperature (115° C.) of $LiBH_4$ from the high-temperature phase was dropped abruptly from the ion conductivity of the high-temperature phase. In addition, in the case of the solid electrolyte film comprising only LiI, the ion conductivity was lower than that of $LiBH_4$, and a high ion conductivity was not achieved particularly at or above the transition temperature (115° C.). Meanwhile, in the cases of the solid electrolyte films comprising $LiBH_4$ and LiI of the present invention (Examples 4 and 5), a high ion conductivity which was at a similar level to that of the solid electrolyte film comprising only $LiBH_4$ (Comparative Example 1) was exhibited at or above the transition temperature (115° C.), whereas an ion conductivity higher than that of the solid electrolyte film of Comparative Example 1 was exhibited below the transition temperature (115° C.) In other words, it was found that by mixing $LiBH_4$ with LiI, and preferably further performing a heat treatment thereon, the transition temperature from the high-temperature phase became lower than that in the case of $LiBH_4$ alone, the ion conductivity below the transition temperature of $LiBH_4$ from the high-temperature phase was raised despite the low ion conductivity of LiI, and a high ion conductivity was achieved over a wider temperature range.

In addition, as is apparent from the results shown in FIG. 2, it was found that when each of the solid electrolyte films comprising $LiBH_4$ and LiI of the present invention was heated at or above the transition temperature (115° C.), the ion conductivity thereof below the transition temperature (115° C.) was increased. This is presumably because the heating increased the crystallinity of the solid electrolyte, thereby increasing the proportion of the high-temperature phase.

As is apparent from the results shown in FIG. 4B, in the case of the solid electrolyte film comprising only $LiBH_4$ (Comparative Example 1), sharp peaks indicative of the high-temperature phase were observed at or above 115° C. (388 K). However, the sharp peaks were not observed below 112° C. (385 K). Meanwhile, as is apparent from the results shown in FIG. 4A, in the case of the solid electrolyte film comprising $LiBH_4$ and LiI of the present invention (Example 4), the peaks indicative of the high-temperature phase were observed not only at or above 120° C. (393 K), but also below 120° C.

As is apparent from the results shown in FIG. 5, in the case of the solid electrolyte film comprising only $LiBH_4$ (Comparative Example 1), the $^7$Li-NMR longitudinal relaxation time changed continuously with the change in measurement temperature in both a range below the transition temperature (115° C.) and a range exceeding the transition temperature, but changed abruptly at the transition temperature. Meanwhile, in the case of the solid electrolyte film comprising $LiBH_4$ and LiI of the present invention (Example 4), the abrupt change in $^7$Li-NMR longitudinal relaxation time was not observed. Accordingly, it was found that the $^7$Li-NMR longitudinal relaxation time changed continuously with the change in measurement temperature.

Example 6

$LiBH_4$ (manufactured by Sigma-Aldrich Co., purity: 90%), LiI (manufactured by Sigma-Aldrich Co., purity: 99.999%), and RbI (manufactured by Sigma-Aldrich Co., purity: 99.999%) were mixed with each other at a molar ratio of $LiBH_4$:LiI:RbI=3:0.9:0.1. The mixture was press molded (25° C., 100 MPa) to prepare pellets. The pellets were transferred to a glass cell, and then heated stepwise to 240° C. under vacuum to thereby be sintered. Thereafter, the sintered product was cooled. Thus, a solid electrolyte was obtained.

Figure 6:
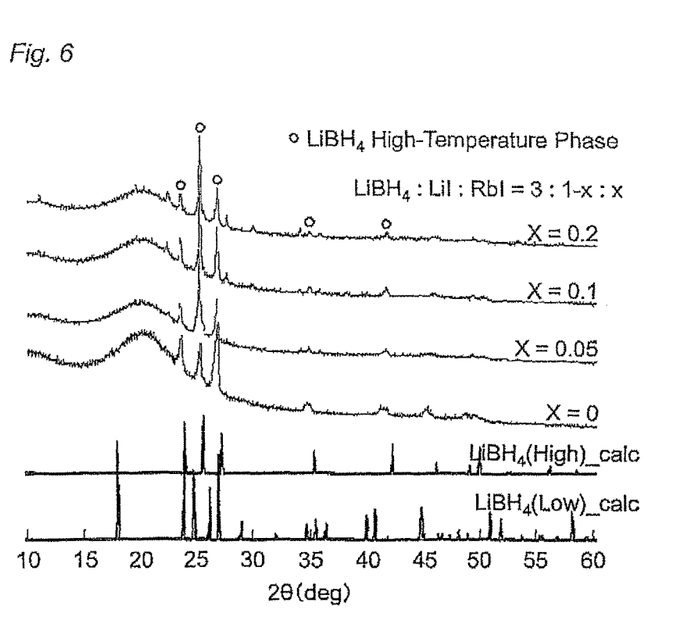
FIG. 6 is a graph showing X-ray diffraction patterns of solid electrolytes comprising LiBH$_4$, LiI, and RbI obtained in Examples 6 to 8.

The solid electrolyte ($LiBH_4$:LiI:RbI=3:0.9:0.1) was subjected to X-ray diffraction measurement in the same manner as in Example 1. FIG. 6 shows the result. Note that FIG. 6 also shows X-ray diffraction spectra of in the high-temperature phase (high-ion-conductive phase) and in the low-temperature phase, as well as an X-ray diffraction spectrum of the solid electrolyte of $LiBH_4$:LiI=3:1.

As is apparent from the result shown in FIG. 6, X-ray diffraction peaks were observed at positions of 2θ=23.4 deg, 25.1 deg, 26.7 deg, 35.0 deg, and 41.5 deg. In addition, diffraction peaks (2θ=11.1 deg, 19.6 deg, 22.4 deg, 27.7 deg, 30.0 deg, and 35.9 deg), which were different from those of the solid electrolyte of $LiBH_4$:LiI=3:1, were also observed.

Example 7

A solid electrolyte was prepared in the same manner as in Example 6, except that the molar ratio between $LiBH_4$, LiI, and RbI were changed to $LiBH_4$:LiI:RbI=3:0.95:0.05. The solid electrolyte ($LiBH_4$:LiI:RbI=3:0.95:0.05) was subjected to X-ray diffraction measurement in the same manner as in Example 1. FIG. 6 shows the result. As is apparent from the result shown in FIG. 6, X-ray diffraction peaks were observed at positions of 2θ=23.4 deg, 25.1 deg, 26.7 deg, 35.0 deg, and 41.5 deg. In addition, diffraction peaks (2θ=19.6 deg, 22.4 deg, 27.7 deg, 30.0 deg, and 35.9 deg), which were different from those of the solid electrolyte of $LiBH_4$:LiI=3:1, were also observed.

Example 8

A solid electrolyte was prepared in the same manner as in Example 6, except that the molar ratio between $LiBH_4$, LiI, and RbI were changed to $LiBH_4$:LiI:RbI=3:0.8:0.2. The solid electrolyte ($LiBH_4$:LiI:RbI=3:0.8:0.2) was subjected to X-ray diffraction measurement in the same manner as in Example 1. FIG. 6 shows the result. As is apparent from the result shown in FIG. 6, X-ray diffraction peaks were observed at positions of 2θ=23.4 deg, 25.1 deg, 26.7 deg, 34.9 deg, and 41.4 deg. In addition, diffraction peaks (2θ=11.1 deg, 19.6 deg, 22.4 deg, 27.7 deg, 30.0 deg and 35.9 deg), which were different from those of the solid electrolyte of $LiBH_4$:LiI=3:1, were also observed.

As is apparent from the results shown in FIG. 6, in the cases of the solid electrolytes comprising $LiBH_4$, LiI, and RbI of the present invention (Examples 6 to 8), X-ray diffraction peaks which corresponded to the high-temperature phase of $LiBH_4$ were observed at 25° C. In other words, it was found that, in the solid electrolyte comprising $LiBH_4$, LiI, and RbI of the present invention, the state of $LiBH_4$ in the high-temperature phase was kept at 25° C.

Example 9

Figure 7:
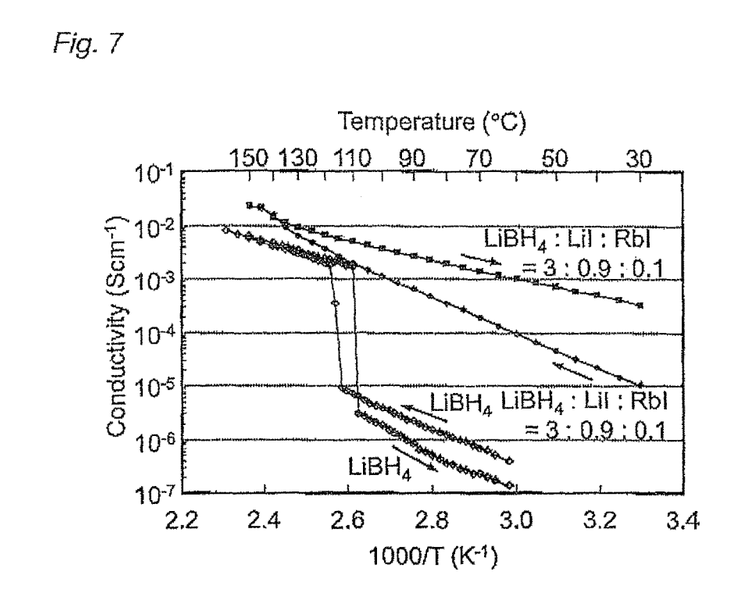
FIG. 7 is a graph showing the relationship between ion conductivity and measurement temperature of a solid electrolyte obtained in Example 9.

A solid electrolyte film was produced in the same manner as in Example 4, except that pellets ($LiBH_4$:LiI:RbI=8:0.9:0.1) prepared in the same manner as in Example 6 was used in place of the melted mixture (LiBIL:LiI=3:1). Then, while the solid electrolyte film was being heated from around 30° C. (303 K) to around 150° C. (423 K), the ion conductivity thereof was measured for every 5° C. increase, with a measurement time for each point being about 5 minutes. FIG. 7 shows the relationship between the ion conductivity and the measurement temperature at this time.

Subsequently, while the solid electrolyte film was being cooled from around 150° C. (423 K) to around 30° C. (303 K), the ion conductivity thereof was measured for every 5° C. decrease, with a measurement time for each point being about 5 minutes. FIG. 7 shows the relationship between the ion conductivity and the measurement temperature at this time. Note that FIG. 7 also shows the results in Comparative Example 1.

Figure 8:
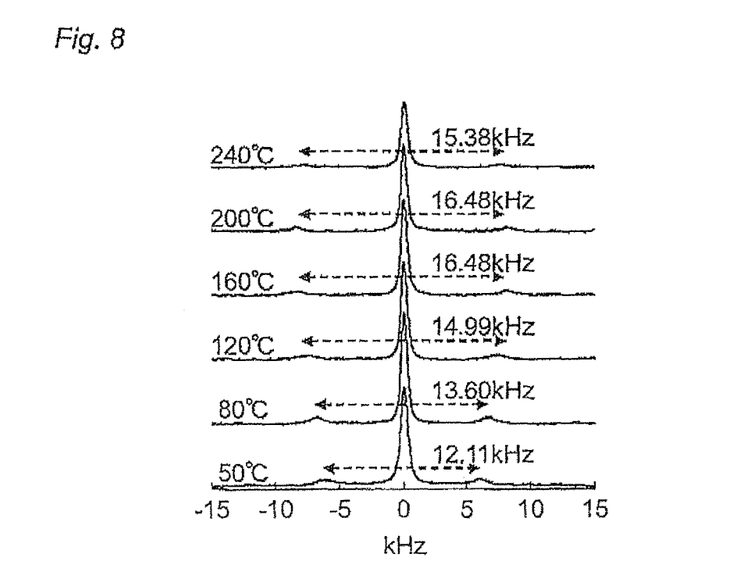
FIG. 8 is a graph showing $^7$Li-NMR spectra of the solid electrolyte obtained in Example 9.
Figure 9:
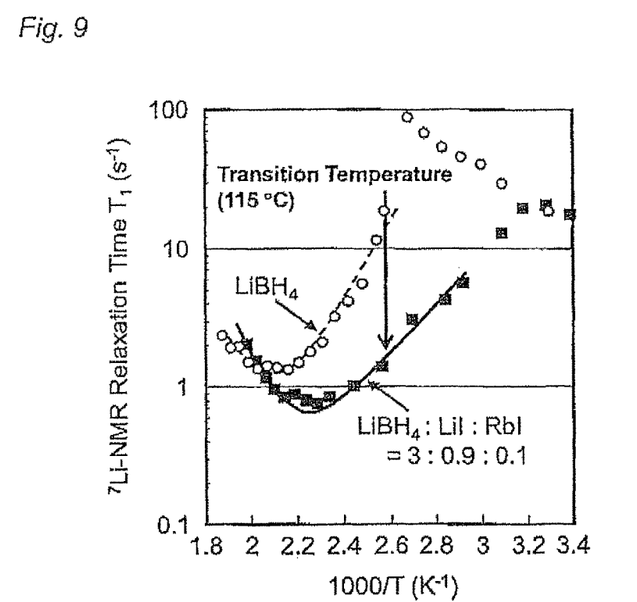
FIG. 9 is a graph showing the relationship between $^7$Li-NMR longitudinal relaxation time and measurement temperature of the solid electrolyte obtained in Example 9.

Next, the solid electrolyte film was subjected to $^7$Li-NMR measurement in the same manner as in Example 4 under conditions of a resonance frequency of 116 MHz, and temperature of 50° C. (323 K) to 240° C. (513 K) to determine $^7$Li-NMR longitudinal relaxation time. FIG. 8 shows $^7$Li-NMR spectra at various temperatures. In addition, FIG. 9 shows the relationship between the $^7$Li-NMR longitudinal relaxation time and the measurement temperature. Note that FIG. 9 also shows the results in Comparative Example 1.

As is apparent from the results shown in FIG. 7, in the case of the solid electrolyte film comprising LiBH$_4$, LiI, and RbI of the present invention (Example 9), the ion conductivity was always higher than that of the solid electrolyte film comprising only LiBH$_4$ (Comparative Example 1) in a temperature range from 30° C. to 150° C. In addition, as is apparent from the results shown in FIGS. 2 and 7, the solid electrolyte film comprising LiBH$_4$, LiI, and RbI (Example 9) exhibited an ion conductivity higher than that of the solid electrolyte film comprising LiBH$_4$ and LiI (Example 4). In other words, it was found that by mixing LiBH$_4$ with LiI and RbI, and preferably further performing a heat treatment thereon, the transition temperature from the high-temperature phase became lower than that in the case of LiBH$_4$ alone, a high ion conductivity was achieved over a wide temperature range despite the low ion conductivity of LiI, and particularly an ion conductivity higher than that of LiBH$_4$ was achieved also at or above the transition temperature of LiBH$_4$ from the high-temperature phase.

As is apparent from the results shown in FIG. 8, also in the case of the solid electrolyte film comprising LiBH$_4$, LiI, and RbI of the present invention (Example 9), Peaks indicative of the high-temperature phase were observed not only at or above 120° C. (393 K), but also below 120° C.

As is apparent from the results shown in FIG. 9, also in the case of the solid electrolyte film comprising LiBH$_4$, LiI, and RbI of the present invention (Example 9), the abrupt change in $^7$Li-NMR longitudinal relaxation time, which was observed in the solid electrolyte film comprising only LiBH$_4$ (Comparative Example 1), was not observed. Hence, it was found that the $^7$Li-NMR longitudinal relaxation time changed continuously with the change in measurement temperature.

Example 10

Figure 10:
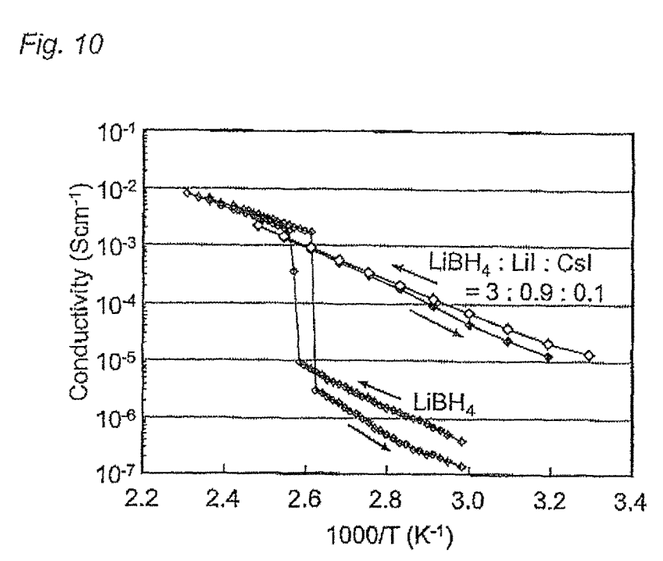
FIG. 10 is a graph showing the relationship between ion conductivity and measurement temperature of a solid electrolyte obtained in Example 10.

Pellets (LiBH$_4$:LiI:CsI (molar ratio)=3:0.9:0.1) were prepared in the same manner as in Example 6, except that CsI (manufactured by Sigma-Aldrich Co., purity: 99.999%) was used in place of RbI. A solid electrolyte film was produced in the same manner as in Example 9, except that these pellets (LiBH$_4$:LiI:CsI=3:0.9:0.1) were used in place of the pellets (LiBH$_4$:LiI:RbI). Then, while the solid electrolyte film was being heated from around 30° C. (303 K) to around 130° C. (403 K), the ion conductivity thereof was measured for every 10° C. increase, with a measurement time for each point being about 5 minutes. FIG. 10 shows the relationship between the ion conductivity and the measurement temperature at this time.

Subsequently, while the solid electrolyte film was being cooled from around 130° C. (403 K) to around 40° C. (313 K), the ion conductivity thereof was measured for every 10° C. decrease, with a measurement time for each point being about 5 minutes. FIG. 10 shows the relationship between the ion conductivity and the measurement temperature at this time. Note that FIG. 10 also shows the results in Comparative Example 1.

As is apparent from the results shown in FIG. 10, it was found that, also in the case of the solid electrolyte film comprising LiBH$_4$, LiI, and CsI of the present invention (Example 10), the transition temperature from the high-temperature phase became lower than that in the case of LiBH$_4$ alone (Comparative Example 1), the ion conductivity below the transition temperature of LiBH$_4$ from the high-temperature phase was raised despite the low ion conductivity of LiI, and a high ion conductivity was achieved over a wider temperature range.

Example 11

LiBH$_4$ (manufactured by Sigma-Aldrich Co., purity: 90%) and LiNH$_2$ (manufactured by Sigma-Aldrich Co.) were mixed with each other at a molar ratio of LiBH$_4$:LiNH$_2$=1:3 by using a planetary ball mill under an argon atmosphere for 1 hour. This mixture was press molded (25° C., 100 MPa), and then heated at 100° C. for 5 hours under an argon atmosphere to thereby be sintered. Thus, a solid electrolyte film was produced.

Figure 11:
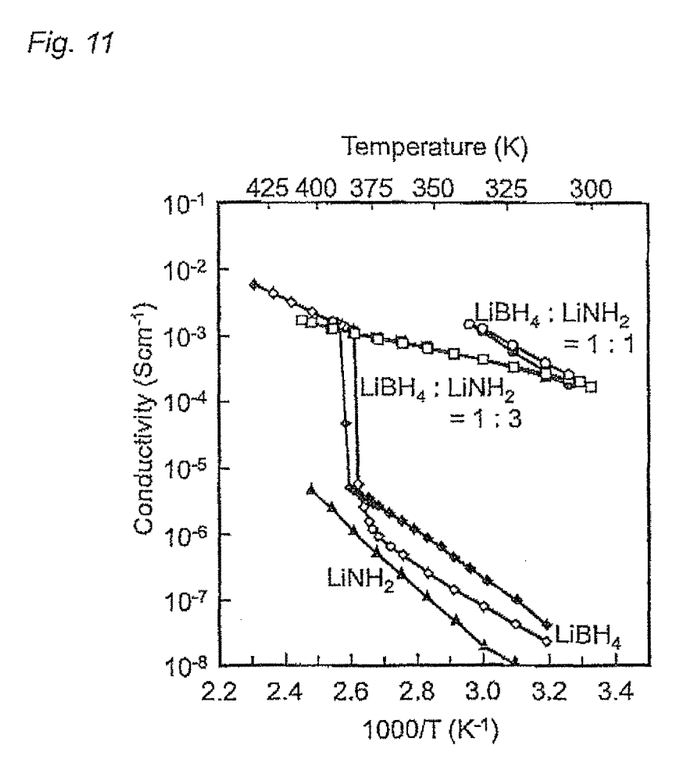
FIG. 11 is a graph showing the relationship between ion conductivity and measurement temperature of solid electrolytes obtained in Example 11 and 12.

While this solid electrolyte film (LiBH$_4$:LiNH$_2$=1:3) was being heated from around 25° C. (298x) to around 135° C. (408 K), the ion conductivity thereof was measured in the same manner as in Example 4 for approximately every 10° C. increase, with a measurement time for each point being about 5 minutes. FIG. 11 shows the relationship between the ion conductivity and the measurement temperature at this time.

Subsequently, while the solid electrolyte film was being cooled from around 135° C. (408 K) to around 30° C. (303 K), the ion conductivity thereof was measured for approximately every 10° C. decrease, with a measurement time for each point being about 5 minutes. FIG. 11 shows the relationship between the ion conductivity and the measurement temperature at this time. Note that FIG. 11 also shows the results of measurement conducted on the solid electrolyte films each comprising LiBH$_4$ alone or LiNH$_2$ alone.

Example 12

A solid electrolyte was produced in the same manner as in Example 11, except that the molar ratio of LiBH$_4$ and LiNH$_2$ mixed with each other was changed to LiBH$_4$:LiNH$_2$=1:1, and that the heating temperature was changed to 60° C. Then, while the solid electrolyte was being heated from around 30° C. (303 K) to around 65° C. (338 K), the ion conductivity thereof was measured for approximately every 10° C. increase, with a measurement time for each point being about 5 minutes. FIG. 11 shows the relationship between the ion conductivity and the measurement temperature at this time.

Subsequently, while the solid electrolyte was being cooled from around 65° C. (338 K) to around 30° C. (303 K), the ion conductivity thereof was measured for approximately every 10° C. decrease, with a measurement time for each point being about 5 minutes. FIG. 11 shows the relationship between the ion conductivity and the measurement temperature at this time.

As is apparent from the results shown in FIG. 11, it was found that, also in the case of the solid electrolyte film comprising LiBH$_4$ and LiNH$_2$ at a molar ratio=1:3 of the present invention (Example 11), the transition temperature from the high-temperature phase became lower than that in the case of LiBH$_4$ alone, the ion conductivity below the transition temperature of LiBH$_4$ from the high-temperature phase was raised despite the low ion conductivity of LiNH$_2$, and a high ion conductivity was achieved over a wider temperature range. In addition, it was found that the solid electrolyte film comprising $LiBH_4$ and $LiNH_2$ had a tendency that the lower the content of $LiNH_2$ was, the higher the ion conductivity was.

INDUSTRIAL APPLICABILITY

As has been described above, according to the present invention, it is possible to lower the transition temperature of $LiBH_4$ from the high-temperature phase (the high-ion-conductive phase) by adding the specific alkali metal compound to $LiBH_4$.

Accordingly, the solid electrolyte of the present invention exhibits a high ion conductivity even below the transition temperature (115° C.) of $LiBH_4$ from the high-temperature phase. Therefore, the solid electrolyte of the present invention is useful as a solid electrolyte for lithium ion secondary batteries and the like.

The invention claimed is:

1. A solid electrolyte for a lithium ion secondary battery, consisting of:
   $LiBH_4$;
   $LiX^1$, where $X^1$ represents a halogen atom; and
   optionally, an alkali metal compound represented by the formula (1a):

$$MX^2 \qquad (1a)$$

in formula (1a), M represents at least one alkali metal atom selected from the group consisting of Na, K, Rb, and Cs, and $X^2$ represents a halogen atom.

2. The solid electrolyte according to claim 1, wherein a molar ratio between the $LiBH_4$ and the $LiX^1$ is as follows: $LiBH_4:LiX^1=1:1$ to $20:1$.

3. A lithium ion secondary battery comprising the solid electrolyte according to claim 1.

4. A method for producing the solid electrolyte for a lithium ion secondary battery according to claim 1, comprising:
   melt-mixing $LiBH_4$ with $LiX^1$, where $X^1$ represents a halogen atom, and optionally with an alkali metal compound represented by the formula (1a):

$$MX^2 \qquad (1a)$$

in formula (1a), M represents at least one alkali metal atom selected from the group consisting of Na, K, Rb, and Cs, and $X^2$ represents a halogen atom; and then cooling the mixture.

5. The method for producing a solid electrolyte according to claim 4, wherein
   a molar ratio between the $LiBH_4$ and the $LiX^1$ mixed with each other is as follows: $LiBH_4:LiX^1=1:1$ to $20:1$.

6. A method for producing a solid electrolyte for a lithium ion secondary battery, comprising:
   heating a solid electrolyte obtained by the production method according to claim 4 at or above 115° C.; and then
   cooling the solid electrolyte.

7. The solid electrolyte according to claim 1, wherein the solid electrolyte consists of the $LiBH_4$, the $LiX^1$, and the alkali metal compound represented by the formula (1a).

8. A lithium ion secondary battery comprising the solid electrolyte according to claim 7.

9. A method for producing the solid electrolyte for a lithium ion secondary battery according to claim 1, comprising:
   mixing $LiBH_4$ with $LiX^1$ (wherein $X^1$ represents a halogen atom) and an alkali metal compound represented by the formula (1a):

$$MX^2 \qquad (1a)$$

in formula (1a), M represents at least one alkali metal atom selected from the group consisting of Na, K, Rb, and Cs, and $X^2$ represents a halogen atom;
   heating the mixture, thereby melting or sintering the mixture; and then
   cooling the mixture.

10. A method for producing a solid electrolyte for a lithium ion secondary battery, comprising:
    heating a solid electrolyte obtained by the production method according to claim 9 at or above 115° C.; and then
    cooling the solid electrolyte.

11. A solid electrolyte for a lithium ion secondary battery, consisting of:
    $LiBH_4$;
    a first alkali metal compound represented by the formula (1b):

$$MX^1 \qquad (1b)$$

in formula (1b), M represents Li and $X^1$ represents at least one selected from the group consisting of $NR_2$ groups (each R represents a hydrogen atom or an alkyl group) and $N_2R$ groups (R represents a hydrogen atom or an alkyl group); and
    optionally a second alkali metal compound represented by the formula (1a):

$$MX^2 \qquad (1a)$$

in formula (1a), M represents at least one alkali metal atom selected from the group consisting of Na, K, Rb, and Cs, and $X^2$ represents a halogen atom.

12. A lithium ion secondary battery comprising the solid electrolyte according to claim 11.

13. A method for producing the solid electrolyte for a lithium ion secondary battery according to claim 11, comprising:
    mixing $LiBH_4$ with a first alkali metal compound represented by the formula (1b):

$$MX^1 \qquad (1b)$$

in formula (1b), M represents Li and $X^1$ represents at least one selected from the group consisting of $NR_2$ groups (each R represents a hydrogen atom or an alkyl group) and $N_2R$ groups (R represents a hydrogen atom or an alkyl group);
    heating the mixture, thereby melting or sintering the mixture; and then
    cooling the mixture.

14. A method for producing a solid electrolyte for a lithium ion secondary battery, comprising:
    heating a solid electrolyte obtained by the production method according to claim 13 at or above 115° C.; and then
    cooling the solid electrolyte.

15. The solid electrolyte according to claim 11, wherein the solid electrolyte consists of the $LiBH_4$, the first alkali metal compound represented by the formula (1b) and the second alkali metal compound represented by the formula (1a).

16. A lithium ion secondary battery comprising the solid electrolyte according to claim 15.

17. A method for producing a solid electrolyte according to claim 13, wherein:
    when the $LiBH_4$ and the first alkali metal compound represented by the formula (1b) are mixed with each other, a second alkali metal compound represented by the formula (1a):

$$MX^2 \qquad (1a)$$

in formula (1a), M represents at least one alkali metal atom selected from the group consisting of Na, K, Rb, and Cs, and $X^2$ represents a halogen atom, is further mixed.

18. A method for producing a solid electrolyte for a lithium ion secondary battery, comprising:

heating a solid electrolyte obtained by the production method according to claim 17 at or above 115° C; and then cooling the solid electrolyte.

* * * * *